(12) United States Patent
Wang

(10) Patent No.: US 11,932,310 B2
(45) Date of Patent: Mar. 19, 2024

(54) CONTAINER OF ALL-TERRAIN VEHICLE AND ALL-TERRAIN VEHICLE THEREOF

(71) Applicant: SEGWAY TECHNOLOGY CO., LTD., Changzhou (CN)

(72) Inventor: Mingyong Wang, Changzhou (CN)

(73) Assignee: Segway Technology Co., Ltd., Jiangsu (CN)

( * ) Notice: Subject to any disclaimer, the term of this patent is extended or adjusted under 35 U.S.C. 154(b) by 154 days.

(21) Appl. No.: 17/698,147

(22) Filed: Mar. 18, 2022

(65) Prior Publication Data
US 2022/0297764 A1  Sep. 22, 2022

(30) Foreign Application Priority Data
Mar. 18, 2021 (CN) .......................... 202120561131.2

(51) Int. Cl.
| | | |
|---|---|---|
| *B62D 25/24* | (2006.01) | |
| *B60K 5/00* | (2006.01) | |
| *B62D 25/08* | (2006.01) | |
| *B62D 25/12* | (2006.01) | |
| *F02M 35/04* | (2006.01) | |

(52) U.S. Cl.
CPC .............. *B62D 25/12* (2013.01); *B60K 5/00* (2013.01); *B62D 25/082* (2013.01); *F02M 35/044* (2013.01); *F02M 35/048* (2013.01)

(58) Field of Classification Search
CPC ...... B60K 5/00; F02M 35/044; F02M 35/048; B62D 25/082; B62D 25/24; B62D 33/02
See application file for complete search history.

(56) References Cited

U.S. PATENT DOCUMENTS

| | | | | |
|---|---|---|---|---|
| 6,626,256 | B2 * | 9/2003 | Dennison | B62D 25/10 |
| | | | | 180/69.24 |
| 7,172,232 | B2 * | 2/2007 | Chiku | E05B 83/32 |
| | | | | 296/37.14 |
| 8,231,164 | B2 * | 7/2012 | Schubring | B60R 7/04 |
| | | | | 296/193.07 |
| 10,202,151 | B1 * | 2/2019 | Nakamura | B62D 25/087 |
| 10,369,861 | B2 * | 8/2019 | Deckard | B60G 21/055 |
| 10,703,422 | B2 * | 7/2020 | Wilson, III | B62D 33/037 |
| 10,766,533 | B2 * | 9/2020 | Houkom | B62D 21/11 |
| 10,981,448 | B2 * | 4/2021 | Safranski | B62D 63/04 |

FOREIGN PATENT DOCUMENTS

| | | |
|---|---|---|
| AU | 2016265556 B2 | 5/2019 |
| CN | 105151132 A | 12/2015 |
| CN | 205737750 U | 11/2016 |
| CN | 206265163 U | 6/2017 |
| TW | 201518155 A | 5/2015 |

* cited by examiner

*Primary Examiner* — Frank B Vanaman
(74) *Attorney, Agent, or Firm* — Harter Secrest & Emery LLP; Timothy W. Menasco, Esq.

(57) ABSTRACT

A container of an all-terrain vehicle includes: a container body including a bottom plate and a front side plate, the front side plate being connected to a front-side edge of the bottom plate, the bottom plate being defined with a first through hole, and the front side plate being defined with a second through hole in communication with the first through hole; a first cover plate detachably arranged at the first through hole; a second cover plate detachably arranged at the second through hole and detachable relative to the first cover plate.

13 Claims, 3 Drawing Sheets

US 11,932,310 B2

CONTAINER OF ALL-TERRAIN VEHICLE AND ALL-TERRAIN VEHICLE THEREOF

CROSS-REFERENCE TO RELATED APPLICATION

The present disclosure is based upon and claims a priority to Chinese Patent Application No. 202120561131.2, filed on Mar. 18, 2021, the entire content of which is incorporated herein by reference.

FIELD

The present disclosure relates to a technical field of all-terrain vehicles, and more particularly, to a container of an all-terrain vehicle and an all-terrain vehicle thereof.

BACKGROUND

In a related art, a container of an all-terrain vehicle is an integral structure and arranged on a frame of the vehicle as an integral piece. However, in case of failure of a power assembly and some other components arranged under the container, it is impossible to inspect and repair these components more simply and conveniently.

SUMMARY

The present disclosure aims to solve at least one of the technical problems existing in the related art. To this end, the present disclosure provides a container of an all-terrain vehicle. In the container of the all-terrain vehicle, a first cover plate and a second cover plate may be opened, and then components can be inspected and repaired, which is simple and convenient to operate.

The present disclosure further provides an all-terrain vehicle.

The container of the all-terrain vehicle according to the present disclosure includes: a container body including a bottom plate and a front side plate, the front side plate being connected to a front-side edge of the bottom plate, the bottom plate being defined with a first through hole, and the front side plate being defined with a second through hole in communication with the first through hole; a first cover plate detachably arranged at the first through hole; a second cover plate detachably arranged at the second through hole and detachable relative to the first cover plate.

An all-terrain vehicle is further provided and includes a driver's cab arranged in front of the all-terrain vehicle; a container arranged behind the all-terrain vehicle; an air filter located under the container; an engine located under the container and connected with the air filter, the engine comprising a cylinder head; the container includes: a container body including a bottom plate and a front side plate, the front side plate being connected to a front-side edge of the bottom plate, the bottom plate being defined with a first through hole, and the front side plate being defined with a second through hole in communication with the first through hole; a first cover plate detachably arranged at the first through hole; a second cover plate detachably arranged at the second through hole and detachable relative to the first cover plate.

Additional aspects and advantages of the present disclosure will be given in part in the following description, become apparent in part from the following description, or be learned from the practice of the present disclosure.

BRIEF DESCRIPTION OF THE DRAWINGS

The above and/or additional aspects and advantages of the present disclosure will become apparent and easy to understand from following descriptions of embodiments in combination with accompanying drawings, in which.

DETAILED DESCRIPTION

Embodiments of the present disclosure are described in detail below. The embodiments described with reference to accompanying drawings are exemplary. The embodiments of the present disclosure are described in detail below.

A container 1 of an all-terrain vehicle 2 according to embodiments of the present disclosure is described below with reference to FIGS. 1 to 5. The container 1 of the all-terrain vehicle 2 is mounted on a frame of the all-terrain vehicle 2.

Figure 3:
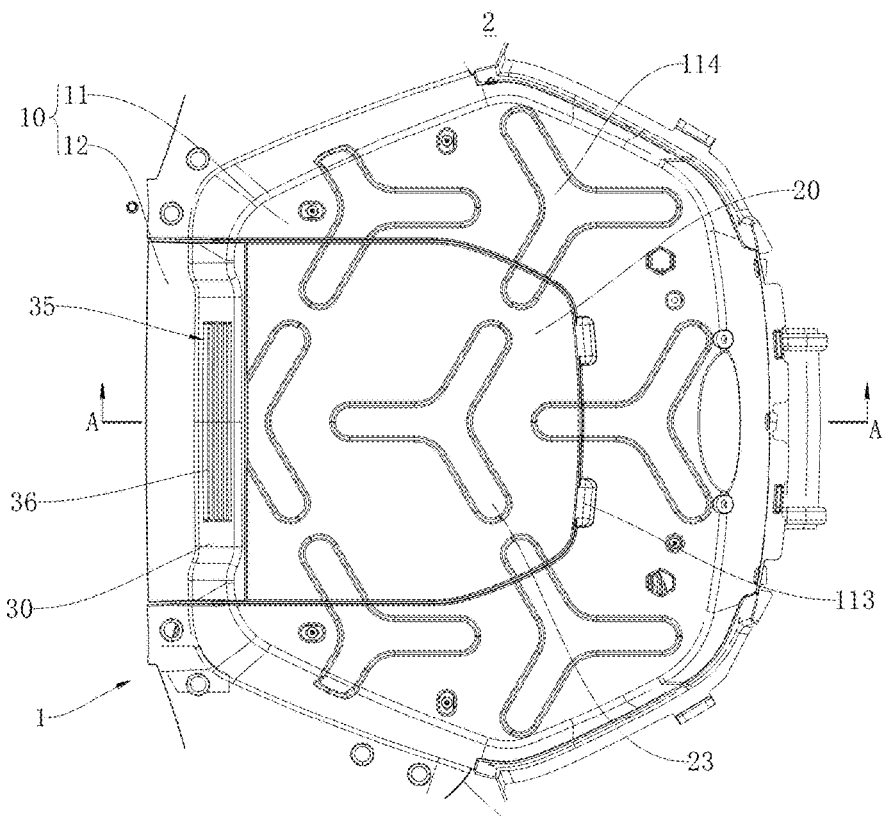
FIG. 3 is a plan view of an all-terrain vehicle according to an embodiment of the present disclosure.
Figure 4:
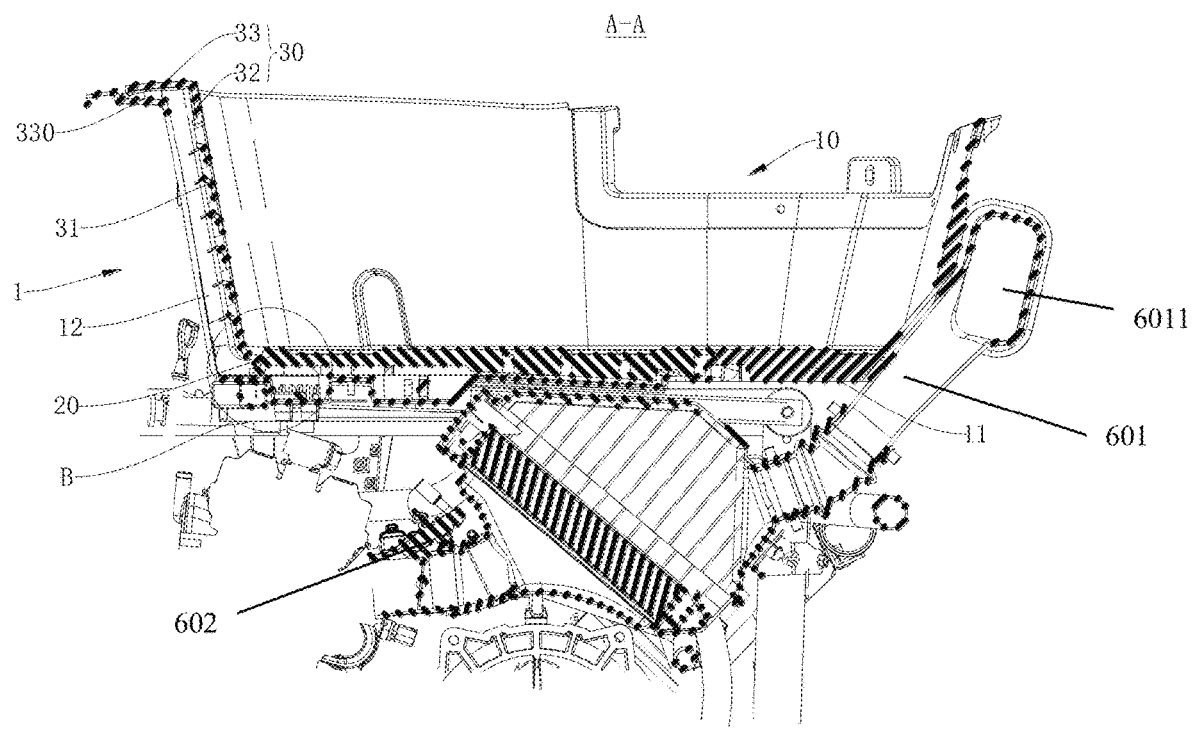
FIG. 4 is a sectional view in an A-A direction in FIG. 3.

As shown in FIG. 3 and FIG. 4, the container 1 of the all-terrain vehicle 2 according to the embodiments of the present disclosure may be configured to load goods, so as to meet needs of a user. The container 1 includes a container body 10, a first cover plate 20 and a second cover plate 30. The container body 10 includes a bottom plate 11 and a front side plate 12. The bottom plate 11 is arranged at a bottom of the container 1 to mainly support the goods. The bottom plate 11 may also be mounted with the frame of the all-terrain vehicle 2, such that the container 1 is fixedly connected to the all-terrain vehicle 2. Moreover, the front side plate 12 is connected to a front-side edge of the bottom plate 11, so as to prevent goods from falling from a front side of the container 1.

Figure 1:
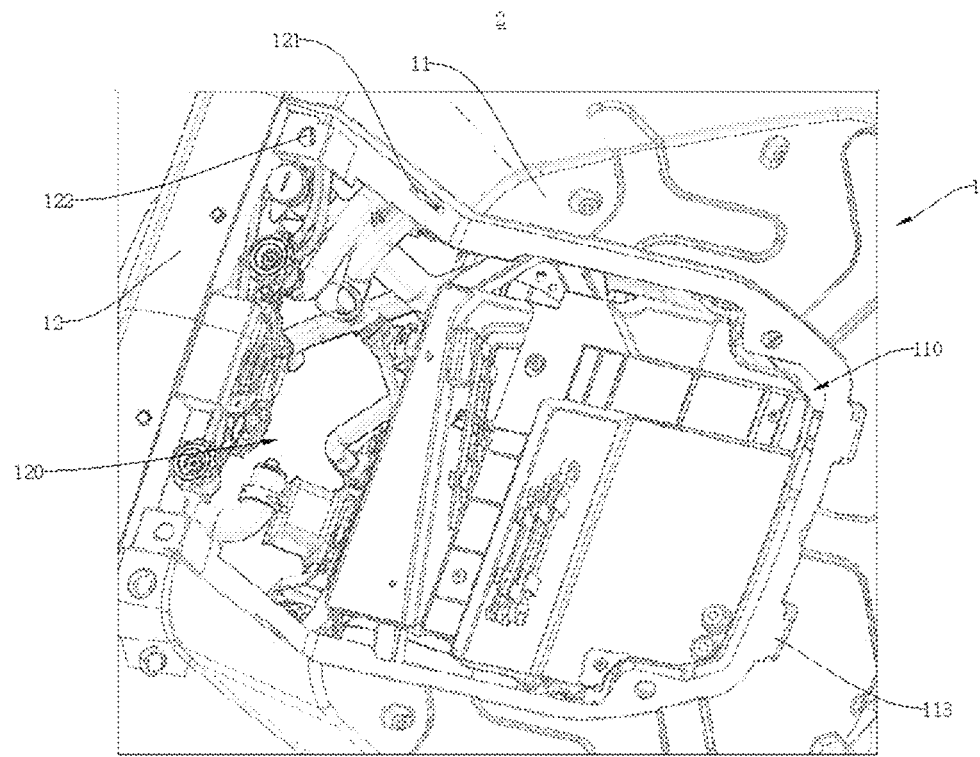
FIG. 1 is a partially schematic view of an all-terrain vehicle according to an embodiment of the present disclosure.
Figure 2:
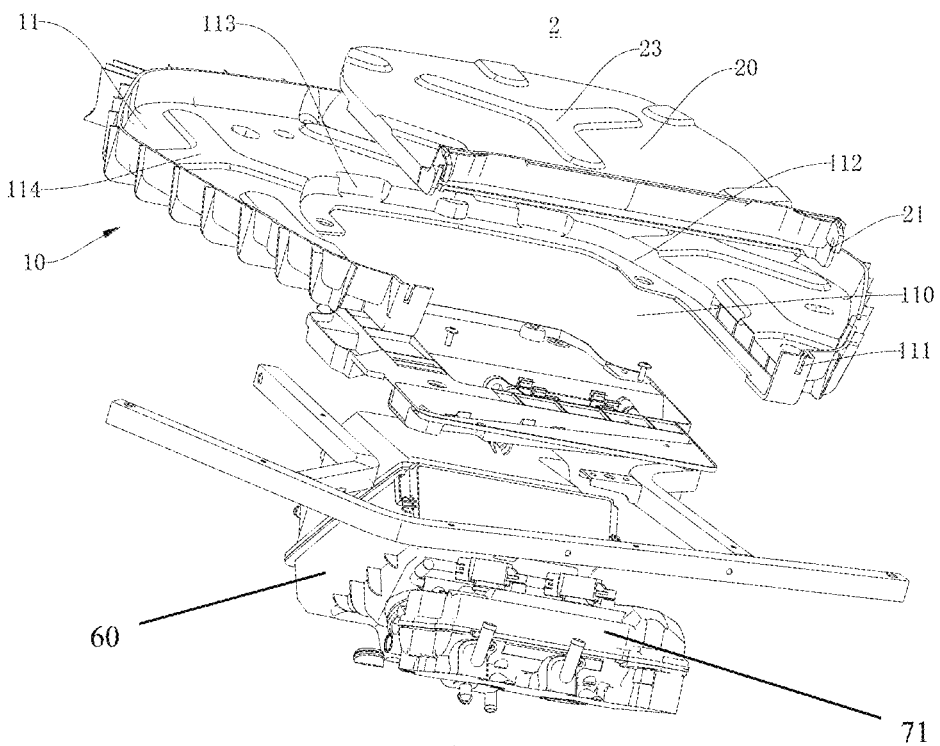
FIG. 2 is a partially exploded view of an all-terrain vehicle according to an embodiment of the present disclosure.

As shown in FIG. 1 and FIG. 2, the bottom plate 11 is defined with a first through hole 110, and the first cover plate 20 is detachably arranged at the first through hole 110. In a case of failure of a component under the bottom plate 11, the user may repair and inspect the component under the bottom plate 11 through the first through hole 110. In addition, the first cover plate 20 is detachably arranged at the first through hole 110. Through such reasonable arrangement, goods may be loaded, so as to prevent the goods from falling downwards from the container 1, and the user may inspect and repair the component under the bottom plate 11 after opening the first cover plate 20, which is simple and convenient to operate.

As shown in FIG. 1, the front side plate 12 is defined with a second through hole 120 in communication with the first through hole 110, and the second cover plate 30 is detachably arranged at the second through hole 120. The second through hole 120 is defined in the front side plate 12, such that in case of a failure of a component in front of and under the front side plate 12, the user may repair and inspect the component in front of and under the front side plate 12 through the second through hole 120. In addition, the second cover plate 30 is detachably arranged at the second through hole 120. Through such reasonable arrangement, goods may be loaded, so as to prevent the goods from falling from the front of the container 1, and the user may inspect and repair the component in front of and under the front side plate 12 after opening the second cover plate 30, which is simple and convenient to operate. The component at lower part may include a power assembly and an air filter, the power assembly may include an engine, and an air inlet pipeline of the engine is connected to the air filter.

In addition, the second cover plate 30 is detachable relative to the first cover plate 20. The second cover plate 30 is also fixedly connected to the first cover plate 20, so as to prevent goods from falling from a gap between the second cover plate 30 and the first cover plate 20. When the component under the bottom plate 11 or the component in front of and under the front side plate 12 are repaired and inspected, only the first cover plate 20 or the second cover plate 30 need to be removed, which is also more convenient to operate.

As shown in FIG. 2, the first cover plate 20 is provided with a first snap portion 21, and the bottom plate 11 is provided with a second snap portion 111. One of the first snap portion 21 and the second snap portion 111 is a snap, the other one of the first snap portion 21 and the second snap portion 111 is a snap groove, and the snap is snapped with the snap groove. The first cover plate 20 is provided with the first snap portion 21, and the bottom plate 11 is provided with the second snap portion 111. One of the first snap portion 21 and the second snap portion 111 is the snap, the other one of the first snap portion 21 and the second snap portion 111 is the snap groove, and the snap may be snapped with the snap groove. Thus, the first cover plate 20 may be fixedly connected to the bottom plate 11, so as to avoid the gap between the first cover plate 20 and the bottom plate 11, thereby preventing the goods from falling under the bottom plate 11.

Further, as shown in FIG. 2, a position of the bottom plate 11 corresponding to an edge of the first through hole 110 is provided with a step portion 112, an edge of the first cover plate 20 is arranged on the step portion 112, and the first cover plate 20 is detachably connected to the step portion 112. The position of the bottom plate 11 corresponding to the edge of the first through hole 110 is provided with the step portion 112, the edge of the first cover plate 20 is arranged on the step portion 112, and the first cover plate 20 is detachably connected to the step portion 112, so as to further improve the connection stability between the first cover plate 20 and the bottom plate 11. Moreover, it may be more convenient to open the first cover plate 20, so as to better facilitate the operation and use for the user.

In addition, as shown in FIG. 2 and FIG. 3, a position of the bottom plate 11 corresponding to a rear-side edge of the first through hole 110 is defined with a hand groove 113. The position of the bottom plate 11 corresponding to the rear-side edge of the first through hole 110 is defined with the hand groove 113, such that the user may place his finger at the hand groove 113, and then open the first cover plate 20 through his finger, which will be more convenient to operate.

According to an embodiment of the present disclosure, as shown in FIG. 1 and FIG. 4, the front side plate 12 is provided with a first hanging portion 121, and the second cover plate 30 is provided with a second hanging portion 31. One of the first hanging portion 121 and the second hanging portion 31 is a hook, the other one of the first hanging portion 121 and the second hanging portion 31 is a hanging hole, and the hook is fitted with the hanging hole in a hanging manner. The front side plate 12 is provided with the first hanging portion 121, and the second cover plate 30 is provided with the second hanging portion 31. One of the first hanging portion 121 and the second hanging portion 31 is the hook, the other one of the first hanging portion 121 and the second hanging portion 31 is the hanging hole, and the hook may be fixedly connected to the hanging hole in the hanging manner, such that the second cover plate 30 may be fixedly connected to the front side plate 12, so as to avoid a gap between the second cover plate 30 and the front side plate 12, thereby preventing goods from falling from the front of the container 1.

Specifically, as shown in FIG. 4, the second cover plate 30 includes a cover body 32 and a flange 33. The flange 33 is connected to a top of the cover body 32, and arranged at a top of the front side plate 12. The front side plate 12 is provided with a first positioning portion 122, and the flange 33 is provided with a second positioning portion 330. One of the first positioning portion 122 and the second positioning portion 330 is a positioning column, the other one of the first positioning portion 122 and the second positioning portion 330 is a positioning hole, and the positioning column is positioned and fitted with the positioning hole. The front side plate 12 is provided with the first positioning portion 122, and the flange 33 is provided with the second positioning portion 330. Moreover, one of the first positioning portion 122 and the second positioning portion 330 is the positioning column, the other one of the first positioning portion 122 and the second positioning portion 330 is the positioning hole, and the positioning column may be positioned and fitted with the positioning hole for positioning. Thus, the flange 33 may be better arranged on the top of the front side plate 12, and the gap between the second cover plate 30 and the front side plate 12 may be avoided. Moreover, the second cover plate 30 and the front side plate 12 may be further fixedly connected, so as to prevent goods from falling from the front of the container 1.

Figure 5:
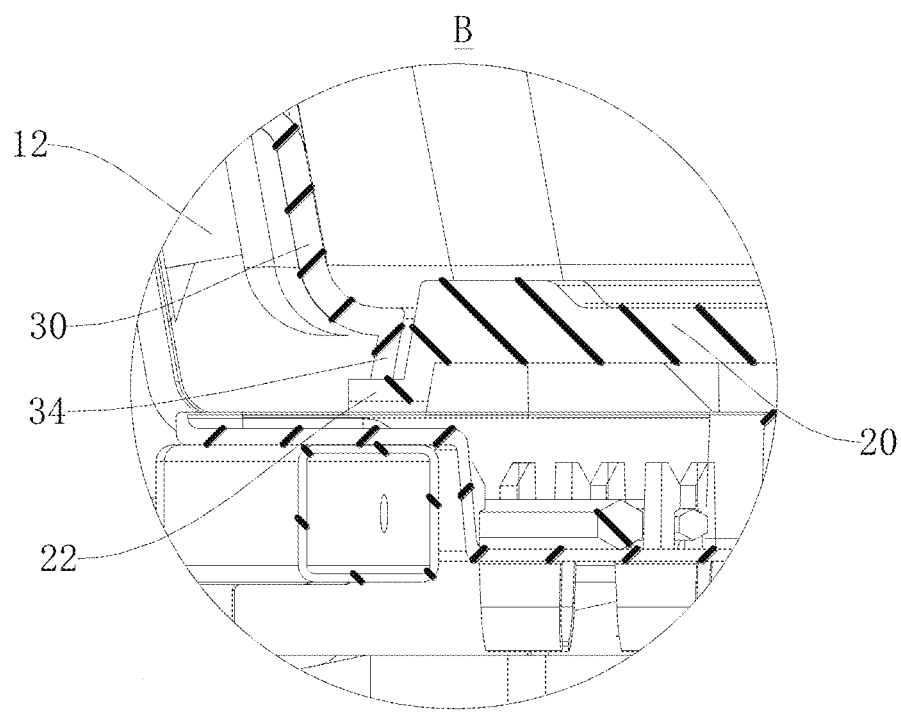
FIG. 5 is an enlarged view of portion B in FIG. 4.
Figure 6:
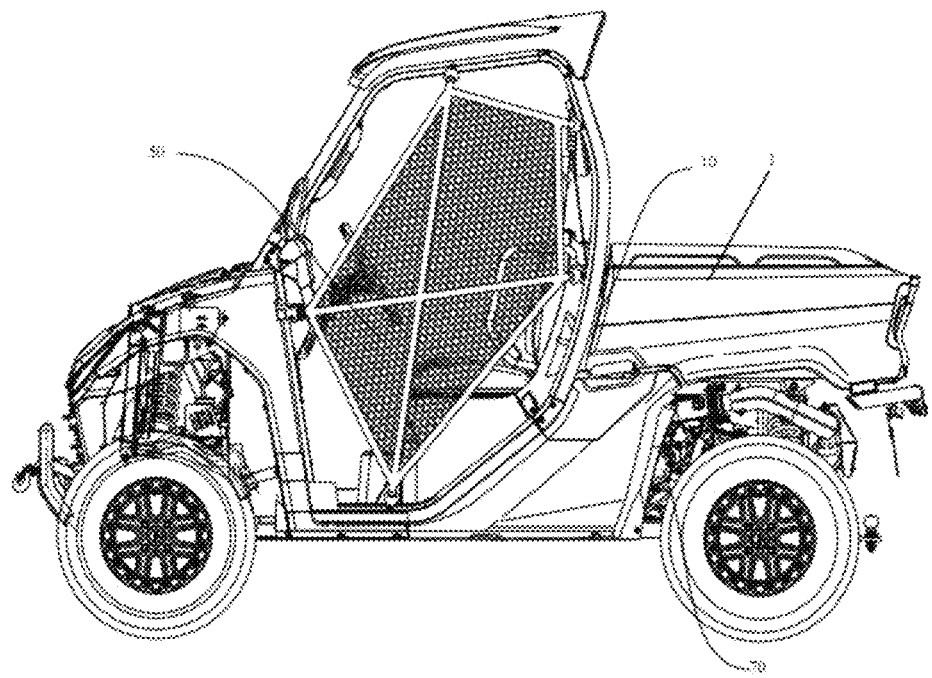
FIG. 6 is a schematic view of an all-terrain vehicle according to an embodiment of the present disclosure.

According to an embodiment of the present disclosure, as shown in FIG. 5, a front-side edge of the first cover plate 20 is provided with a first pressing edge 22 protruding forward, a bottom of the second cover plate 30 is provided with a second pressing edge 34 protruding backward, and the second pressing edge 34 is located above the first pressing edge 22. The second pressing edge 34 is located above the first pressing edge 22, such that the connection between the first cover plate 20 and the second cover plate 30 is much tighter, so as to avoid the gap between the second cover plate 30 and the first cover plate 20, thereby preventing goods from falling between the second cover plate 30 and the first cover plate 20. Moreover, through such the arrangement, the first cover plate 20 is detachably connected to the second cover plate 30, which is more simple and convenient to operate.

In some embodiments, as shown in FIG. 2 and FIG. 3, the bottom plate 11 is provided with a first reinforcing rib 114, and the first cover plate 20 is provided with a second reinforcing rib 23. The bottom plate 11 is provided with the first reinforcing rib 114, and the first cover plate 20 is provided with the second reinforcing rib 23, so as to strengthen structural strength of the bottom plate 11 and the first cover plate 20, thereby enhancing loadbearing capacity of the bottom plate 11 and the first cover plate 20, and further avoiding damage to the bottom plate 11 and the first cover plate 20 when loading goods.

Of course, as shown in FIG. 3, the second cover plate 30 is defined with a vent hole 35. Due to large amount of heat discharged by some components during operation, the second cover plate 30 is defined with the vent hole 35, and the heat may be discharged from the vent hole 35, so as to cool the components and prolong the service life of the components, such that the components may work normally for a long time. In addition, a vent grille 36 is defined at the vent hole 35. The vent grille 36 may play a guiding role and speed up the heat discharged from the vent hole 35, so as to avoid the damage of components due to the large amount of heat which cannot be quickly dissipated.

As shown in FIGS. 1-6, an all-terrain vehicle 2 according to the embodiments of the present disclosure is provided and includes a driver's cab 50 arranged in front of the all-terrain vehicle; a container 1 of the all-terrain vehicle 2 described in the above embodiments, the container 1 being arrange behind the all-terrain vehicle 2; an air filter 60 located under the container 1; an engine 70 located under the container 1 and connected with the air filter 60, the engine 70 comprising a cylinder head 71.

In some embodiments, at least one of the air filter 60 and the engine 70 is located under the first through hole 110.

In some embodiments, the air filter 60 is tilted along a front-rear direction of the all-terrain vehicle 2, and the air filter 60 is tilted downwards from front to rear.

In some embodiments, the air filter 60 is provided with an air inlet duct 601 and an air outlet duct 602, the air inlet duct 601 is connected at a rear portion of the air filter 60 and the air outlet duct 602 is provided at a front portion of the air filter 60, the air inlet duct 601 is provided with an air inlet port 6011 arranged at a rear portion of the container 1.

In the description of the present disclosure, it should be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the drawings under discussion. These relative terms are only for convenience of description and do not indicate or imply that the device or element referred to must have a particular orientation, or be constructed and operated in a particular orientation. Thus, these terms shall not be construed as limitation on the present disclosure.

In the description of the present disclosure, "first feature" and "second feature" may include one or more of the features. In the description of the present disclosure, "a plurality of" means two or more that two. In the description of the present disclosure, a structure in which a first feature is "on" or "below" a second feature may include an embodiment in which the first feature is in direct contact with the second feature, and may further include an embodiment in which the first feature and the second feature are not in direct contact with each other, but are contacted via an additional feature formed therebetween. In the description of the present disclosure, a first feature "on," "above," or "on top of" a second feature may include an embodiment in which the first feature is right or obliquely "on," "above," or "on top of" the second feature, or just means that the first feature is at a height higher than that of the second feature.

Reference throughout this specification to "an embodiment," "some embodiments," "an exemplary embodiment," "an example," "a specific example," or "some examples," means that a particular feature, structure, material, or characteristic described in connection with the embodiment or example is included in at least one embodiment or example of the present disclosure. Thus, the exemplary descriptions of the above terms throughout this specification are not necessarily referring to the same embodiment or example.

Although embodiments of the present disclosure have been shown and described, it would be appreciated by those skilled in the art that various changes, modifications, alternatives and variations may be made in the embodiments without departing from principles and purposes of the present disclosure. The scope of the present disclosure is defined by the claims and their equivalents.

What is claimed is:

1. An all-terrain vehicle, comprising:
a driver's cab arranged in front of the all-terrain vehicle;
a container arranged behind the all-terrain vehicle;
an air filter located under the container;
an engine located under the container and connected with the air filter, the engine comprising a cylinder head;
wherein the container comprises:
a container body comprising a bottom plate and a front side plate, the front side plate being connected to a front-side edge of the bottom plate, the bottom plate being defined with a first through hole, and the front side plate being defined with a second through hole in communication with the first through hole;
a first cover plate detachably arranged at the first through hole;
a second cover plate detachably arranged at the second through hole and detachable relative to the first cover plate.

2. The all-terrain vehicle according to claim 1, wherein at least one of the air filter and the engine is located under the first through hole.

3. The all-terrain vehicle according to claim 2, wherein a position of the bottom plate corresponding to an edge of the first through hole is provided with a step portion, and an edge of the first cover plate is arranged on the step portion and detachably connected to the step portion.

4. The all-terrain vehicle according to claim 1, wherein the air filter is tilted along a front-rear direction of the all-terrain vehicle, and the air filter is tilted downwards from front to rear.

5. The all-terrain vehicle according to claim 4, wherein the air filter is provided with an air inlet duct and an air outlet duct, the air inlet duct is connected at a rear portion of the air filter and the air outlet duct is provided at a front portion of the air filter, the air inlet duct is provided with an air inlet port arranged at a rear portion of the container.

6. The all-terrain vehicle according to claim 1, wherein the first cover plate is provided with a first snap portion, the bottom plate is provided with a second snap portion, one of the first snap portion and the second snap portion is a snap, the other one of the first snap portion and the second snap portion is a snap groove, and the snap is snapped with the snap groove.

7. The all-terrain vehicle according to claim 1, wherein a position of the bottom plate corresponding to a rear-side edge of the first through hole is defined with a hand groove.

8. The all-terrain vehicle according to claim 1, wherein the front side plate is provided with a first hanging portion, the second cover plate is provided with a second hanging portion, one of the first hanging portion and the second hanging portion is a hook, the other one of the first hanging portion and the second hanging portion is a hanging hole, and the hook is fitted with the hanging hole in a hanging manner.

9. The all-terrain vehicle according to claim 8, wherein the second cover plate comprises a cover body and a flange, the flange is connected to a top of the cover body and arranged on a top of the front side plate, the front side plate is provided with a first positioning portion, the flange is provided with a second positioning portion, one of the first positioning portion and the second positioning portion is a positioning column, the other one of the first positioning portion and the second positioning portion is a positioning hole, and the positioning column is positioned and fitted with the positioning hole.

10. The all-terrain vehicle according to claim 1, wherein a front-side edge of the first cover plate is provided with a first pressing edge protruding forward, a bottom of the second cover plate is provided with a second pressing edge protruding backward, and the second pressing edge is located above the first pressing edge.

11. The all-terrain vehicle according to claim 1, wherein the bottom plate is provided with a first reinforcing rib, and the first cover plate is provided with a second reinforcing rib.

12. The all-terrain vehicle according to claim 1, wherein the second cover plate is defined with a vent hole.

13. The all-terrain vehicle according to claim 12, wherein a vent grille is defined at the vent hole.

* * * * *